(12) United States Patent
Yamamoto et al.

(10) Patent No.: US 12,145,895 B2
(45) Date of Patent: Nov. 19, 2024

(54) SORTING DEVICE

(71) Applicants: TAIHEIYO ENGINEERING CORPORATION, Tokyo (JP); TAIHEIYO CEMENT CORPORATION, Tokyo (JP)

(72) Inventors: Yasushi Yamamoto, Tokyo (JP); Yoshiaki Maeda, Tokyo (JP); Kazuhiko Yamaguchi, Tokyo (JP); Kunio Motoyoshi, Tokyo (JP); Takayuki Kimura, Tokyo (JP); Kouji Kamada, Tokyo (JP); Kazushi Izumi, Tokyo (JP); Naoki Ueno, Chiba (JP)

(73) Assignee: TAIHEIYO ENGINEERING CORPORATION TAIHEIYO CEMENT CORPORATION, Tokyo (JP)

( * ) Notice: Subject to any disclaimer, the term of this patent is extended or adjusted under 35 U.S.C. 154(b) by 962 days.

(21) Appl. No.: 16/977,982

(22) PCT Filed: Apr. 4, 2018

(86) PCT No.: PCT/JP2018/014388
§ 371 (c)(1),
(2) Date: Nov. 25, 2020

(87) PCT Pub. No.: WO2019/193672
PCT Pub. Date: Oct. 10, 2019

(65) Prior Publication Data
US 2023/0194173 A1     Jun. 22, 2023

(51) Int. Cl.
*B65G 11/20*     (2006.01)
*B65G 33/08*     (2006.01)
(Continued)

(52) U.S. Cl.
CPC ............ *C04B 7/365* (2013.01); *B65G 11/206* (2013.01); *B65G 33/08* (2013.01); *B65G 33/24* (2013.01);
(Continued)

(58) Field of Classification Search
CPC ...... B65G 11/206; B65G 33/00; B65G 33/08; B65G 33/24; B65G 33/26; B65G 47/19;
(Continued)

(56) References Cited

U.S. PATENT DOCUMENTS 2,463,693 A * 3/1949 Huff .......................... C10B 7/10
                                                                               201/3
3,862,594 A * 1/1975 Stolting ................. B65G 33/00
                                                                             100/95
(Continued)

FOREIGN PATENT DOCUMENTS

DE     102015112599 A1 * 2/2017 ............. B65G 47/19
JP         7328467         12/1995
(Continued)

OTHER PUBLICATIONS

Search Report for PCT/JP2018/ 014388.

*Primary Examiner* — James Keenan
(74) *Attorney, Agent, or Firm* — Stetina Brunda Garred & Brucker

(57) ABSTRACT

To provide a fractionating device capable of stably fractionating powders such as cement raw materials by a simple configuration. A fractionating device 1 for fractionating some of a powder (cement raw material) R falling in a chute (main body) 2, wherein the fractionating device is equipped with a screw conveyor 5 which passes through the chute, a part of a casing 5a opening inside the chute, and receives part of the powder from an opening (inlet) 5b, and a collision separation member (collision separation rod) 4 which is (Continued)

provided above the screw conveyor in the chute and collides with an object when an object of a predetermined size or larger falls, and prevents the object from falling directly onto the screw conveyor. A rotation shaft 5d of the screw conveyor may be inclined from 5° to 20° with respect to the horizontal plane so that the end of the discharge port side of the screw conveyor is positioned above the other end and may be equipped with a guide member 3 that guides the powder falling in the chute in the direction of the opening of the screw conveyor.

9 Claims, 3 Drawing Sheets

(51) Int. Cl.
    *B65G 33/24* (2006.01)
    *C04B 7/36* (2006.01)
    *C04B 7/43* (2006.01)
    *F27B 7/32* (2006.01)
    *F27D 3/00* (2006.01)
    *F27D 3/08* (2006.01)
    *F27D 3/10* (2006.01)

(52) U.S. Cl.
    CPC .............. *C04B 7/436* (2013.01); *C04B 7/438* (2013.01); *F27B 7/3205* (2013.01); *F27D 3/0033* (2013.01); *F27D 3/08* (2013.01); *F27D 3/10* (2013.01); *F27B 2007/3288* (2013.01)

(58) Field of Classification Search
    CPC ......... B65G 69/12; C04B 7/365; C04B 7/436; C04B 7/438; F27B 7/3205; F27B 2007/3288; F27D 3/0033; F27D 3/08; F27D 3/10
    USPC .................................. 198/670, 671; 414/213
    See application file for complete search history.

(56) References Cited

U.S. PATENT DOCUMENTS

| | | | | |
|---|---|---|---|---|
| 4,256,453 | A | * | 3/1981 | Csapo ..................... F27D 3/026 432/235 |
| 4,850,515 | A | * | 7/1989 | Cleland ................ B67D 1/0004 222/164 |
| 2018/0340745 | A1 | * | 11/2018 | Rauch ....................... F27D 3/08 |

FOREIGN PATENT DOCUMENTS

| | | | | | |
|---|---|---|---|---|---|
| JP | 9278501 | | 10/1997 | | |
| JP | 2004168605 | A | * | 6/2004 | |
| JP | 2014058699 | A | | 4/2014 | |
| KR | 20110116926 | A | * | 10/2011 | ............. B65G 47/19 |
| KR | 20140030415 | A | * | 3/2014 | ............. B65G 47/18 |
| KR | 20150012916 | A | * | 2/2015 | ........... B65G 11/206 |

* cited by examiner

[Fig. 1]
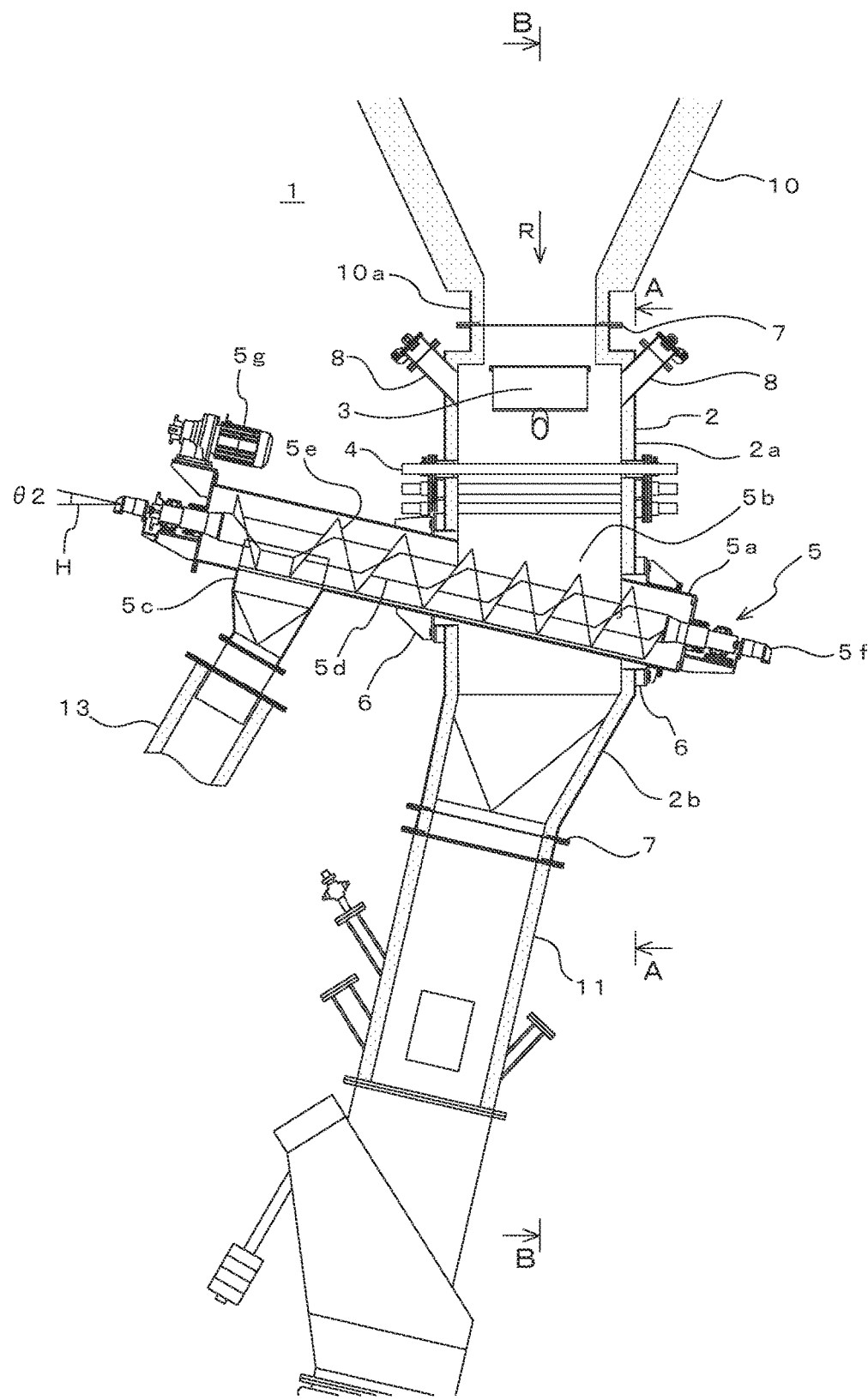

[Fig. 2]
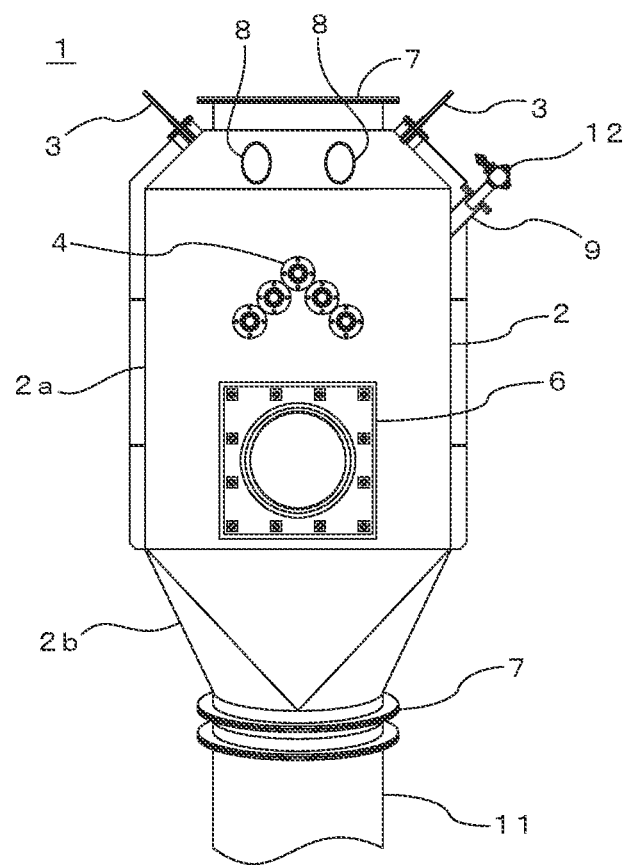

[Fig. 3]
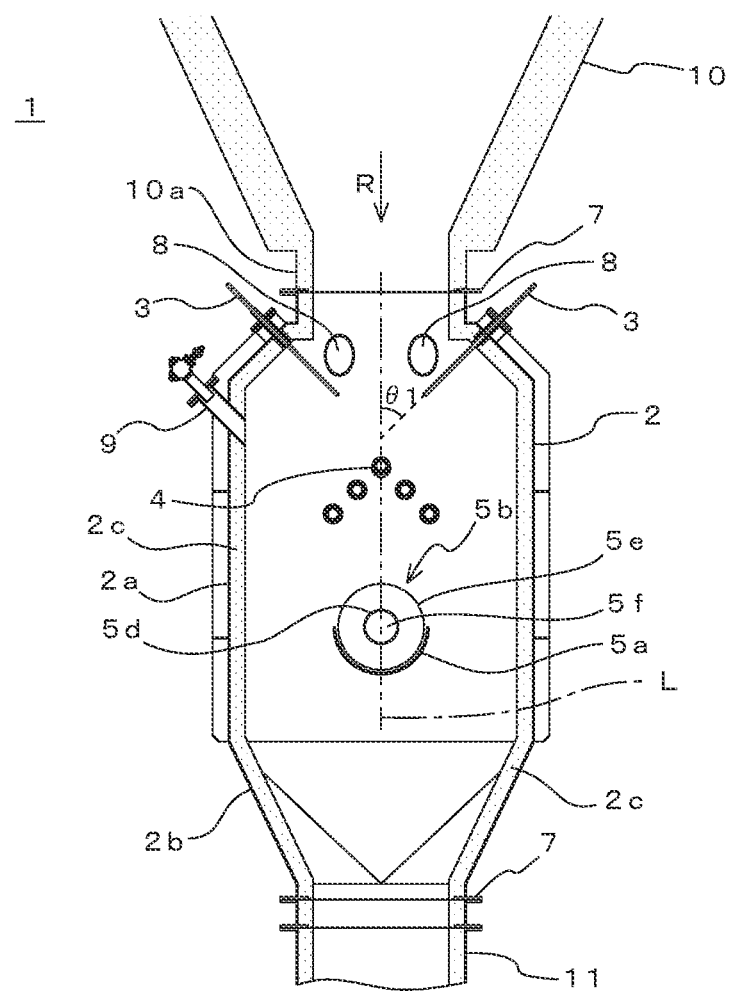

SORTING DEVICE

CROSS-REFERENCE TO RELATED APPLICATIONS

The present application claims priority to International Application No. PCT/JP2018/014388 filed on Apr. 4, 2018, the disclosure of which is incorporated herein by reference.

STATEMENT RE: FEDERALLY SPONSORED RESEARCH/DEVELOPMENT

Not Applicable

BACKGROUND

1. Technical Field of the Invention

The present invention relates to a fractionating device for fractionating powders such as cement raw materials that are discharged from preheater cyclones of a cement burning apparatus.

2. Description of the Related Art

A cement burning apparatus is provided with a preheater, a calciner, a cement kiln and a clinker cooler, and a cement raw material fed to the preheater is preheated through preheater cyclones arranged in stages; calcined in the calciner; and burned in the cement kiln to generate cement clinker. Then, the cement clinker is cooled in the clinker cooler, and is sent to a cement grinding process.

In the above preheater cyclones, a cement raw material is preheated while gradually moves from upper cyclones to lower cyclones. A part of the cement material is sometimes fractionated from an outlet chute of a cyclone to prevent coating on cement manufacturing facility (refer to Patent Document 1), or to recover mercury in a cement kiln exhaust gas (refer to Patent Document 2).
  Patent Document 1: Japanese Patent publication No. 2004-168605 gazette
  Patent Document 2: Japanese Patent publication No. 2014-58699 gazette

BRIEF SUMMARY

A part of the cement raw material falling in the outlet chute of the preheater cyclone sometimes becomes a large block due to aggregation, in such a case, the fractionating device may be damaged, or the large block cannot be received, which may prevent desired fractionating.

In addition, the cement raw material falling in the chute is remarkably high in fluidity, which may cause flushing in the fractionating device to fractionate a cement raw material exceeding desired amount.

Further, the cement raw material in the chute does not drop through a fixed route, so that the fractionating device cannot receive the cement raw material sufficiently, which may prevent desired fractionating.

The present invention has been made in consideration of the problems in the conventional art, and the object thereof is to provide a device capable of stably fractionating powders such as cement raw materials by a simple configuration.

In order to attain the above object, a fractionating device of the present invention is for fractionating some of a powder falling in a chute, and includes: a screw conveyor passing through the chute, a part of a casing opening inside the chute, and receiving part of the powder from the opening; and a collision separation member, which is mounted above the screw conveyor in the chute, for colliding with an object when an object of a predetermined size or larger falls, and preventing the object from falling directly onto the screw conveyor to cause clogging With the present invention, even if some of a powder like a cement raw material falling in the chute becomes a large block due to aggregation, the collision separation member can crush or divide the large block into pieces, so that desired fractionating can be performed while preventing breakage or clogging of the screw conveyor.

In the above fractionating device, an end of a discharging port side of the screw conveyor may be positioned above another end, and an inclination angle of a rotation shaft of the screw conveyor with respect to a horizontal plane can be 5° or more and 20° or less. With this construction, even if powder passes through due to flushing between an inner wall of the screw conveyor and a screw, the powder that has passed can be returned on a reception side of the screw conveyor, which prevents a powder exceeding desired amount from being fractionated.

In the above fractionating device, a guide member for guiding the powder falling in the chute in a direction of the opening of the screw conveyor, which allows a predetermined amount of powder to stably be obtained.

In the above fractionating device, rotation speed of a rotation shaft of the screw conveyor can be variable, which enables easy control of powder amount fractionated.

The above fractionating device may further include a cooling water passage formed in the rotation shaft of the screw conveyor, and means, positioned outside the chute, for feeding a cooling water to the cooling water passage. With this, the powder can be fractionated while preventing breakage of the screw under high temperature environment.

As described above, with the present invention, it becomes possible to stably fractionate powders such as cement raw materials by a simple construction.

BRIEF DESCRIPTION OF THE DRAWINGS

FIG. 1 is a partially sectional front view showing a fractionating device according to an embodiment of the present invention.

FIG. 2 is a cross-sectional view taken along line A-A in FIG. 1.

FIG. 3 is a cross-sectional view taken along line B-B in FIG. 1.

DETAILED DESCRIPTION

Next, embodiments of the present invention will be explained with referenced to FIGS. 1 to 3 in detail. In the following explanation, as an embodiment, a fractionating device according to the present invention is used for a cement raw material (hereinafter abbreviated as "raw material") that is discharged from a preheater cyclone of a cement burning apparatus.

The fractionating device 1 according to the present invention includes: a raw material outlet 10a of a cyclone (third cyclone from the bottom, for instance) 10 of a preheater; a main body (chute) 2 coupled between the cyclone 10 and a raw material chute 11; guide boards 3 obliquely and downwardly penetrating an upper portion 2a of the main body 2; collision separation rods 4 horizontally penetrating the main body 2 below the guide boards 3; a screw conveyor 5 held by a holding member 6 and obliquely penetrating the main body 2 below the collision separation rods 4; and the like. To simplify drawings, the screw conveyor 5 is omitted in FIG. 2, and the screw conveyor 5 is horizontally illustrated in FIG. 3.

The main body 2 is coupled through a flange 7 between the raw material outlet 10a of the cyclone 10 and the raw material chute 11, and includes the upper portion 2a with a rectangular cylindrical shape located just below the raw material outlet 10a, and a lower portion 2b with rounded corners located just above the raw material chute 11 with a cylindrical shape. On the top of the upper portion 2a are formed cleaning ports 8 and a pressure measuring port 9. The cleaning ports 8 are openable and closable, and are used in case that a raw material R adhere to an inner wall of the main body 2 or the screw conveyor 5. Into the pressure measuring port 9 is inserted a pressure gauge 12. On the inner wall of the main body 2 is disposed a refractory 2c.

The guide board 3 is formed in a rectangular shape. As shown in FIG. 3, two guide boards 3 separately penetrate the top of the upper portion 2a of the main body 2 from the left side and the right side, and the angle θ1 between the guide board 3 and the axis L of the upper portion 2a of the main body 2 is set to 40° or less, and the guide boards 3 guide the raw material R falling from the raw material outlet 10a toward the screw conveyor 5 that penetrates the upper portion 2a of the main body 2. The guide boards 3 are supported by the main body 2 in such a manner that insertion lengths into the main body 2 are variable, and when the raw material R falling from the raw material outlet 10a is guided to a receiving port 5b of the screw conveyor 5 without the guide boards 3, the guide boards 3 are not required.

The collision separation rod 4 has a round cross section, and five collision separation rods 4 horizontally penetrate a central portion of the upper portion 2a of the main body 2. As clearly shown in FIGS. 2 and 3, the collision separation rods 4 are symmetrically arranged in a mountain like shape about the central collision separation rod 4. These collision separation rods 4 can crush large blocks falling from the raw material outlet 10a and prevent the large blocks from directly falling on the screw conveyor 5, which avoids breakage of the screw conveyor 5. Each collision separation rod 4 is extractably and insetably supported by the main body 2, and the number of the inserted collision separation rods 4 can be changed.

The screw conveyor 5 is composed of: a casing 5a with a cylindrical shape including the receiving port 5b and a discharging port 5c; a rotation shaft 5d; a screw 5e fixed to the rotation shaft 5d; a motor 5g for controlling rotation speed of the rotation shaft 5d; and a cooling water passage 5f extending in the rotation shaft 5d over the overall length thereof. The receiving port 5b is an opening that is formed by removing the upper half of the casing 5a. An end portion on the discharging port 5c side of the rotation shaft 5d of the screw conveyor 5 locates above another end, and the rotation shaft 5d inclines from 5° to 20° (angle θ2) with respect to the horizontal plane H.

Next, action of the fractionating device 1 with the above construction will be explained with reference to FIG. 1.

A part of the raw material R falling from the raw material outlet 10a of the cyclone 10 is introduced to the receiving port 5b of the screw conveyor 5, through the guide boards 3 and the collision separation rods 4 penetrating the main body 2 of the fractionating device 1, directly as they are or after crushed by the collision separation rods 4, and then enters in the casing 5a. The raw material R entering in the casing 5a is accommodated in a space formed between the inner wall of the casing 5a and the screw 5e; moves leftward by the rotation of the screw 5e; and finally discharged from the discharging port 5c on a fractionating chute 13 side. The raw material R that is not fractionated by the fractionating device 1 is supplied to lower cyclones and the like from the raw material chute 11.

The raw material R is small in particle size and has considerably high fluidity, so that the raw material R sometimes tries to pass through between the inner wall of the casing 5a and the screw 5e of the screw conveyor 5 to rapidly move in the casing 5a toward the discharging port 5c. However, as described above, since the screw conveyor 5 is inclined in such a manner that the discharging port 5c is higher than the receiving port 5b, rapid movement of the raw material R toward the discharging port 5c of the casing 5a is prevented, which prevents larger amount of cement raw material R exceeding desired amount from being discharged from the discharging port 5c.

In order to control the amount of fractionated raw material R, position of the guide board 3 is adjusted or rotation speed of the motor 5g of the screw conveyor 5, that is, rotation speed of the rotation shaft 5d is adjusted.

When inner temperature of the main body 2 is high, a cooling water is fed to the cooling water passage 5f of the rotation shaft 5d from outside of the main body 2 to protect the rotation shaft 5d.

In addition, the main body 2 of the fractionating device 1 can be coupled between the raw material outlet 10a of the cyclone 10 and the raw material chute 11 though the flange 7, so that the fractionating device 1 can be installed to an existing facility with ease. Further, through the flange 7, the main body 2 can be removed from the raw material outlet 10a and the raw material chute 11, and the fractionating chute 13 can be removed from the discharging port 5c. As a result, an overall fractionating device 1 can be removed, which enables easy maintenance.

In the above embodiment, two rectangular guide boards 3 are mounted, the shape and the number of the rectangular guide boards 3, and the angle θ1 between the rectangular guide boards 3 and the axis L of the upper portion 2a of the main body 2 are appropriately changeable in accordance with installation location of the fractionating device 1, the direction that the raw material R flows and so on.

The cross section of the collision separation rod 4 is not limited to a round shape also, a rectangular cross section may be adopted. And, the number and installation location of the collision separation rods 4 can be appropriately changed. Provided that the collision separation rod 4 is able to crush large blocks falling from the raw material outlet 10a to prevent damage of the screw conveyor 5, the collision separation rod 4 is not limited to a rod shape but a plate shape with openings may be adopted for instance.

Further, although a cement raw material that is discharged from a preheater cyclone of a cement burning apparatus is exemplarily fractionated, not only to the cement raw material but also to powders falling in chutes is applied the fractionating device of the present invention, especially preferable to powders with high fluidity and easily becoming large blocks due to aggregation.

DESCRIPTION OF THE REFERENCE NUMERALS 1 fractionating device
2 main body
2a upper portion
2b lower portion
2c refractory 3 guide board
4 collision separation rod
5 screw conveyor
5*a* casing
5*b* receiving port
5*c* discharging port
5*d* rotation shaft
5*e* screw
5*f* cooling water passage
5*g* motor
6 holding member
7 flange
8 cleaning port
9 pressure measuring port
10 cyclone
10*a* raw material outlet
11 raw material chute
12 pressure gauge
13 fractionating chute
R raw material

The invention claimed is:

1. A fractionating device for fractionating some of a powder falling in a first chute into a second chute, comprising:
a screw conveyor passing through the first chute and being configured to extend to the second chute, a part of a casing opening inside the first chute, and receiving part of the powder from the opening, the screw conveyor having a discharging port side, an end of which is positioned above another end of the screw conveyor, and an inclination angle of a rotation shaft of the screw conveyor with respect to a horizontal plane is between 5° and 20°;
a guide member for guiding the powder falling in the first chute in a direction of the opening of the screw conveyor; and
a collision separation member, which is mounted above the screw conveyor in the first chute, for colliding with an object when an object of a predetermined size or larger falls, and preventing the object from falling directly onto the screw conveyor,
wherein rotation speed of a rotation shaft of the screw conveyor is variable.

2. The fractionating device as claimed in claim 1, further comprising a cooling water passage formed in the rotation shaft of the screw conveyor, and means, positioned outside the first chute, for feeding a cooling water to the cooling water passage.

3. The fractionating device as claimed in claim 1, wherein the collision separation member extends transversely to a longitudinal direction of the first chute.

4. The fractionating device as claimed in claim 1, wherein the collision separation member includes a plurality of separation rods arranged in an apex configuration.

5. The fractionating device as claimed in claim 1, wherein the guide member comprises a guide board positioned above the screw conveyor in the first chute, the guide board configured to be moveable relative to the first chute.

6. A fractionating device for fractionating some of a powder falling in a first chute into a second chute, comprising:
a screw conveyor passing through the first chute and being configured to extend to the second chute, a part of a casing opening inside the first chute, and receiving part of the powder from the opening, the screw conveyor having a discharging port side, an end of which is positioned above another end of the screw conveyor, and an inclination angle of a rotation shaft of the screw conveyor with respect to a horizontal plane is between 5° and 20°, a cooling water passage formed in the rotation shaft of the screw conveyor, and means, positioned outside the first chute, for feeding a cooling water to the cooling water passage; and
a collision separation member, which is mounted above the screw conveyor in the first chute, for colliding with an object when an object of a predetermined size or larger falls, and preventing the object from falling directly onto the screw conveyor,
wherein rotation speed of a rotation shaft of the screw conveyor is variable.

7. The fractionating device as claimed in claim 6, wherein the collision separation member extends transversely to a longitudinal direction of the first chute.

8. The fractionating device as claimed in claim 6, wherein the collision separation member includes a plurality of separation rods arranged in an apex configuration.

9. The fractionating device as claimed in claim 6, further comprising a guide board positioned above the screw conveyor in the first chute, the guide board configured to be moveable relative to the first chute.

* * * * *